United States Patent
Nagata

(10) Patent No.: US 10,160,425 B2
(45) Date of Patent: Dec. 25, 2018

(54) FOOT-OPERATED PARKING BRAKE OPERATION DEVICE

(71) Applicant: TOYODA IRON WORKS CO., LTD., Toyota-shi, Aichi (JP)

(72) Inventor: Yasuhiro Nagata, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 0 days.

(21) Appl. No.: 15/523,225

(22) PCT Filed: Oct. 1, 2015

(86) PCT No.: PCT/JP2015/077997
§ 371 (c)(1),
(2) Date: Apr. 28, 2017

(87) PCT Pub. No.: WO2016/072185
PCT Pub. Date: May 12, 2016

(65) Prior Publication Data
US 2017/0320471 A1   Nov. 9, 2017

(30) Foreign Application Priority Data

Nov. 5, 2014   (JP) ................................ 2014-225625

(51) Int. Cl.
*B60T 7/06* (2006.01)
*G05G 1/30* (2008.04)
(Continued)

(52) U.S. Cl.
CPC ................ *B60T 7/06* (2013.01); *B60T 7/045* (2013.01); *G05G 1/30* (2013.01); *G05G 1/44* (2013.01);
(Continued)

(58) Field of Classification Search
CPC . B60T 7/047; B60T 7/06; B60T 7/045; G05G 1/44; G05G 5/06; Y10T 74/20726
See application file for complete search history.

(56) References Cited

U.S. PATENT DOCUMENTS 3,218,883 A  *  11/1965  De Hoff .................. B60T 7/047
                                                       74/534
4,872,368 A  *  10/1989  Porter ..................... B60T 7/047
                                                       74/512
(Continued)

FOREIGN PATENT DOCUMENTS

EP        1728698 A1      12/2006
JP     2009-101767 A       5/2009

OTHER PUBLICATIONS

Dec. 1, 2015 Search Report issued in International Patent Application No. PCT/JP2015/077997.
(Continued)

*Primary Examiner* — Thomas C Diaz
(74) *Attorney, Agent, or Firm* — Oliff PLC

(57) ABSTRACT

A solution to reduce the ratcheting sound that occurs at the start of braking when an operation pedal is operated by foot. Because a mounting seat as a flat part and base plate are provided between a ratchet member and support axial center S of an operation pedal, there is a possibility that the ratchet member's vibration will propagate to the adjacent mounting seat and base plate, amplifying the ratchet sound. However, the adjacent mounting seat and base plate are provided with beads, having cross-sections that bend convexly in a direction substantially orthogonal to the vibration waveform of the ratchet sound produced by a pole coming into contact with serrations when the mounting seat and base plate maintain a flat plate shape; i.e., in a circumferential direction about support axial center S. Therefore, rigidity against the (Continued)

vibration is increased, propagation of vibration is minimized, and ratchet sound is effectively reduced.

6 Claims, 8 Drawing Sheets

(51) Int. Cl.
    *G05G 5/06*       (2006.01)
    *B60T 7/04*       (2006.01)
    *G05G 1/44*       (2008.04)
    *G05G 5/24*       (2006.01)
    *G10K 11/16*     (2006.01)

(52) U.S. Cl.
    CPC ................. *G05G 5/06* (2013.01); *G05G 5/24* (2013.01); *G10K 11/16* (2013.01); *B60Y 2306/09* (2013.01)

(56) References Cited

U.S. PATENT DOCUMENTS

| | | |
|---|---|---|
| 7,574,943 B2 | 8/2009 | Wortmann |
| 2006/0272445 A1 | 12/2006 | Wortmann |

OTHER PUBLICATIONS

Jun. 6, 2018 Extended Search Report issued in European Patent Application No. 15856228.0.

\* cited by examiner

UPPER SIDE OF VEHICLE
FRONT SIDE OF VEHICLE

UPPER SIDE OF VEHICLE

FRONT SIDE OF VEHICLE

FOOT-OPERATED PARKING BRAKE OPERATION DEVICE

TECHNICAL FIELD

The present invention relates to foot-operated parking brake operation devices and particularly to a technique of reducing ratchet sound that is generated when a pawl contacts teeth due to the biasing force of a pawl biasing spring when a braking operation, namely an operation of depressing an operation pedal, is started.

BACKGROUND ART

A foot-operated parking brake operation device is known, comprising: (a) an operation pedal which is mainly made of a metal plate material, and which actuates a parking brake when depressed to be pivoted in one direction about a support axis; (b) a ratchet member which is fixedly attached to the operation pedal, and which has multiple teeth arranged along an arc about the support axis; (c) a pawl disposed on a pedal support and pivotable about an axis parallel to the support axis, the pawl being configured, when meshing with one of the teeth, to prevent the operation pedal from being pivoted back toward an original position thereof in a direction opposite to the one direction whereby the parking brake is kept in an actuated state thereof; (d) a pawl biasing spring biasing the pawl in such a rotational direction that causes the pawl to mesh with one of the teeth; and (e) in which, upon start of a brake operation that is an operation of depressing the operation pedal, the pawl being moved relatively to the ratchet member from a front end of the ratchet member so as to ride over the teeth, such that each time the pawl rides over each of the teeth, the pawl is brought into contact with a subsequent one of the teeth that is subsequent to the each of the teeth (the adjoining tooth) due to a biasing force of the pawl biasing spring applied to the pawl (see Patent Document 1).

RELATED ART DOCUMENTS

Patent Documents

Patent Document 1: Japanese Patent Application Publication No. 2009-101767

SUMMARY OF THE INVENTION

Problem to be Solved by the Invention

In such a conventional foot-operated parking brake operation device, however, when a braking operation is started and the pawl rides over the teeth of the ratchet member, the pawl contacts the teeth due to the biasing force of the pawl biasing spring. Successive hitting sounds (hereinafter referred to as the ratchet sound) are generated by the contact. In the case where the operation pedal is made of a metal plate material, vibrations of the ratchet member may be propagated to the operation pedal and amplified. In the case of hybrid vehicles or vehicles with a start-stop system in which an engine is turned off when the vehicle comes to a stop, even relatively little ratchet sound is disadvantageous due to quietness of those vehicles.

The present invention was developed in view of the above circumstances and it is an object of the present invention to reduce ratchet sound that is generated when a braking operation, namely an operation of depressing an operation pedal, is started.

Solution to Problem

To achieve the above object, a first aspect of the invention provides a foot-operated parking brake operation device comprising: (a) an operation pedal which is mainly made of a metal plate material, and which actuates a parking brake when depressed to be pivoted in one direction about a support axis; (b) a ratchet member which is fixedly attached to the operation pedal, and which has multiple teeth arranged along an arc about the support axis; (c) a pawl disposed on a pedal support and pivotable about an axis parallel to the support axis, the pawl being configured, when meshing with one of the teeth, to prevent the operation pedal from being pivoted back toward an original position thereof in a direction opposite to the one direction whereby the parking brake is kept in an actuated state thereof; (d) a pawl biasing spring biasing the pawl in such a rotational direction that causes the pawl to mesh with one of the teeth; and (e) upon start of a brake operation that is an operation of depressing the operation pedal, the pawl being relatively moved from a front end of the ratchet member so as to ride over the teeth, such that each time the pawl rides over each of the teeth, the pawl is brought into contact with a subsequent one of the teeth that is subsequent to the each of the teeth, due to a biasing force of the pawl biasing spring applied to the pawl, the foot-operated parking brake operation device being characterized in that (f) the operation pedal includes a flat plate-shaped flat portion located between the support axis and the ratchet member, and (g) the flat portion is provided with a bead which is formed by bending the flat portion and which has a convex section, the bead extending in a direction crossing a vibration waveform of ratchet sound, which would be generated when the pawl is brought into contact with each of the teeth due to the biasing force of the pawl biasing spring in absence of provision of the bead in the flat portion.

A second aspect of the invention provides a foot-operated parking brake operation device comprising: (a) an operation pedal which is mainly made of a metal plate material, and which actuates a parking brake when depressed to be pivoted in one direction about a support axis; (b) a ratchet member which is fixedly attached to the operation pedal, and which has multiple teeth arranged along an arc about the support axis; (c) a pawl disposed on a pedal support and pivotable about an axis parallel to the support axis, the pawl being configured, when meshing with one of the teeth, to prevent the operation pedal from being pivoted back toward an original position thereof in a direction opposite to the one direction whereby the parking brake is kept in an actuated state thereof; (d) a pawl biasing spring biasing the pawl in such a rotational direction that causes the pawl to mesh with one of the teeth; and (e) upon start of a brake operation that is an operation of depressing the operation pedal, the pawl being relatively moved from a front end of the ratchet member so as to ride over the teeth, such that each time the pawl rides over each of the teeth, the pawl is brought into contact with a subsequent one of the teeth that is subsequent to the each of the teeth, due to a biasing force of the pawl biasing spring applied to the pawl, the foot-operated parking brake operation device being characterized in that (f) the operation pedal includes a flat plate-shaped flat portion located between the support axis and the ratchet member, and (g) the flat portion is provided with a bead which is formed by bending the flat portion and which has a convex section, the bead extending in a circumferential direction about the support axis.

A third aspect of the invention provides the foot-operated parking brake operation device according to the first or second aspect of the invention, characterized in that the operation pedal includes a flat attachment seat bent into a crank in a thickness direction, the ratchet member is fixedly attached to the attachment seat, and the bead is formed in the attachment seat corresponding to the flat portion.

A fourth aspect of the invention provides the foot-operated parking brake operation device according to the third aspect of the invention, characterized in that (a) a part of the attachment seat where a front end of the ratchet member is located comprises a projecting part that projects toward the support axis, and the bead is formed in the projecting part, and (b) on a rear end side of the ratchet member, the bead is formed in a base plate portion provided as the flat portion between the attachment seat and the support axis.

A fifth aspect of the invention provides the foot-operated parking brake operation device according to any one of the first to fourth aspects of the invention, characterized in that the ratchet member is attached to the operation pedal at two positions that are the front end of the ratchet member and an intermediate position between the front and rear ends of the ratchet member.

Advantageous Effects of the Invention

The foot-operated parking brake operation device according to the first aspect of the invention includes the flat plate-shaped flat portion located between the support axis of the operation pedal and the ratchet member. Accordingly, vibrations of the ratchet member may be propagated to the flat portion and may be amplified. However, the flat portion is provided with the bead which is formed by bending the flat portion and which has a convex section, the bead extending in the direction crossing the vibration waveform of the ratchet sound, which would be generated when the pawl is brought into contact with each of the teeth due to the biasing force of the pawl biasing spring in absence of provision of the bead in the flat portion. This increases rigidity against the vibrations and restrains propagation of the vibrations and effectively reduces the ratchet sound.

The foot-operated parking brake operation device according to the second aspect of the invention includes the flat plate-shaped flat portion located between the support axis of the operation pedal and the ratchet member. Accordingly, vibrations of the ratchet member may be propagated to the flat portion and may be amplified. However, the flat portion is provided with the bead which is formed by bending the flat portion and which has a convex section, the bead extending in the circumferential direction about the support axis. This increases rigidity against the vibrations of the ratchet sound that are generated when the pawl is brought into contact with each of the teeth due to the biasing force of the pawl biasing spring and restrains propagation of the vibrations and effectively reduces the ratchet sound. That is, the vibration waveform of the ratchet member that would be generated when the pawl is brought into contact with each of the teeth due to the biasing force of the pawl biasing spring in absence of provision of the bead in the flat portion has concave and convex curves along the circumferential direction about the support axis. Accordingly, forming the bead having a convex section and extending in the direction crossing the waveform, namely in the circumferential direction about the support axis, increases rigidity against vibrations, whereby the ratchet sound can be effectively reduced.

The third aspect of the invention relates to the case in which the operation pedal includes the flat attachment seat bent into a crank in the thickness direction, the ratchet member is fixedly attached to the attachment seat, and the bead is formed in the attachment seat. This increases rigidity of the attachment seat and reduces the ratchet sound.

The fourth aspect of the invention relates to the case in which the part of the attachment seat where the front end of the ratchet member is located comprises the projecting part that projects toward the support axis, and the bead is formed in the projecting part of the attachment seat. On the rear end side of the ratchet member, the bead is formed in the base plate portion between the attachment seat and the support axis. This increases rigidity of both the attachment seat and the base plate portion and appropriately reduces the ratchet sound.

In the fifth aspect of the invention, the ratchet member is fixed to the operation pedal at the two positions, namely at the front end of the ratchet member and the intermediate position in the ratchet member. This allows the front end side of the ratchet member to be restrained without increasing the region of the fixed portion, whereby initial ratchet sound, namely loud hitting sounds at the beginning, can be particularly effectively reduced. Moreover, the range of variation in sound pressure level (loudness of sound) of individual hitting sounds that are generated when the pawl contacts the multiple teeth is reduced, whereby the ratchet sound can be made less harsh to the ear.

MODES FOR CARRYING OUT THE INVENTION

Figure 1:
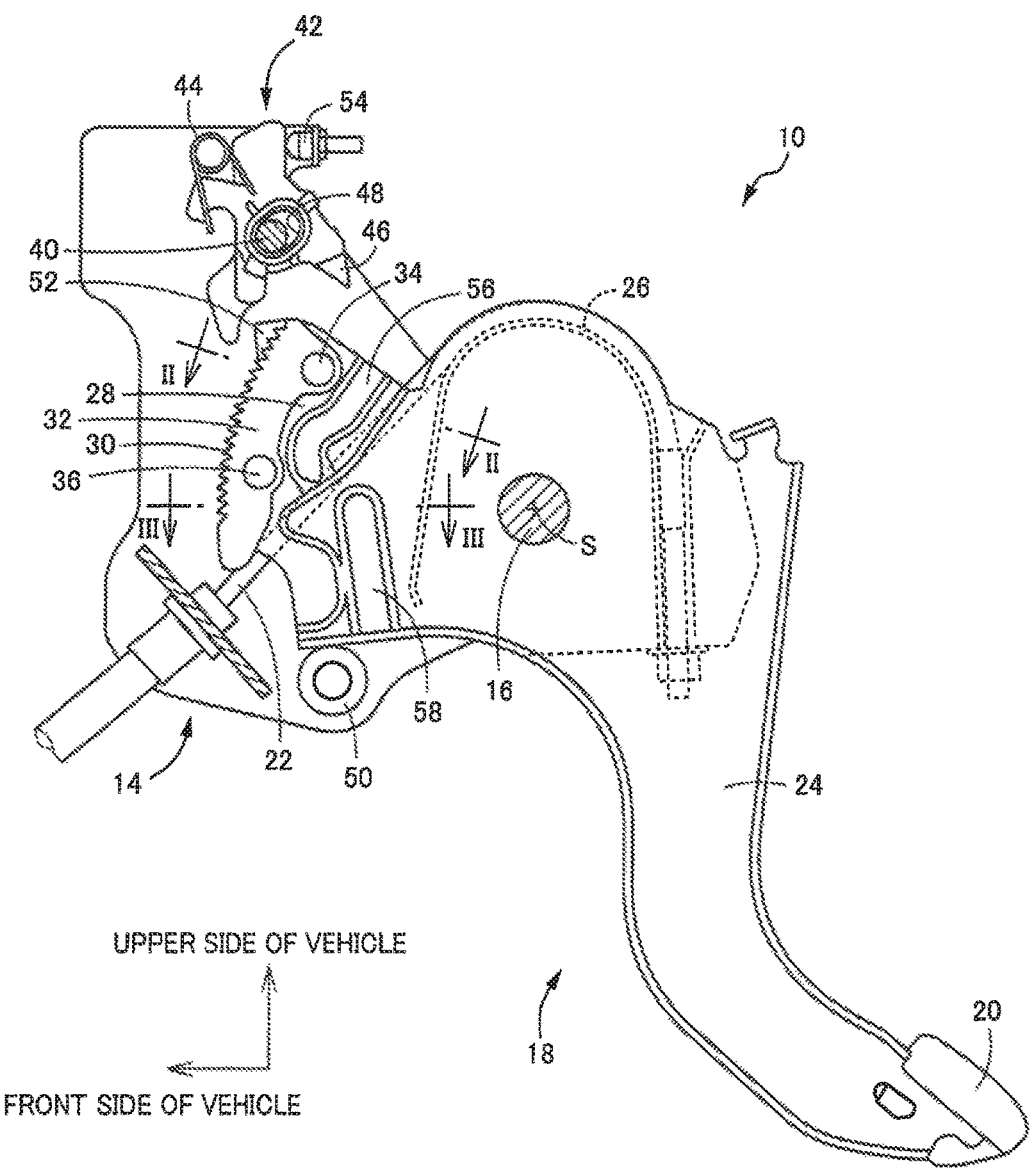
FIG. 1 is a schematic left side view showing an example of a foot-operated parking brake operation device to which the present invention is applied, is a partially cutaway view.

The teeth of the ratchet member are inclined teeth inclined along a circumferential direction of the arc shape, and are inclined in the opposite direction about the support axis to the one direction in which the operation pedal is depressed, so that the operation of depressing the operation pedal when the braking operation is started is permitted even though the pawl engages with the tooth. The pawl biasing spring is preferably a helical tension spring, a helical compression spring, or a helical torsion spring. For example, the pawl biasing spring is disposed so that it constantly biases the pawl in such a direction that the pawl meshes with the tooth and so that, when a release member releases the pawl from meshing engagement with the tooth and the operation pedal is allowed to pivot back, the parking brake can be released. However, the pawl biasing spring may be configured so that it is disposed so as to function as a turnover spring that reverses the direction in which the pawl is biased, and so that, by merely performing the operation of depressing the operation pedal, the pawl is released from meshing engagement with the tooth and the operation pedal is allowed to pivot back, whereby the parking brake can be released.

For example, the operation pedal is formed by performing press bending etc. on a metal plate material and includes the flat plate-shaped flat portion substantially perpendicular to the support axis. The flat portion is bent to form the bead having a convex section by pressing etc. The bead may have various sectional shapes such as a semicircular arc or a trapezoid, a rectangle (squared U-shape), a U-shape, and a V-shape. Since the bead is formed so as to extend in the direction crossing the vibration waveform of the ratchet sound, rigidity against the vibrations is increased and the ratchet sound can be effectively reduced. For example, the waveform of the ratchet sound in the flat portion can be obtained by modal analysis, and the bead is formed so as to extend in the direction crossing the waveform. It is desirable that the bead be formed so as to extend in a direction substantially perpendicular to the waveform. For example, it is desirable that the bead be formed so as to extend in a direction within the range of about ±30° or less, more preferably about ±20° or less, with respect to the direction perpendicular to the waveform. The bead need not necessarily be formed so as to cross the direction perpendicular to the waveform at a predetermined angle or less along the entire length of the bead. For example, the bead may be formed so as to extend linearly and to cross the direction perpendicular to the waveform at an average angle of about ±30° or less, and more preferably about ±20° or less.

In the second aspect of the invention, the bead is formed so as to extend in the circumferential direction about the support axis. However, the bead need not necessarily be formed in an arc shape. For example, the bead may be formed so as to extend linearly in a direction including a component of the circumferential direction. In this case, it is desirable that the bead be formed so as to extend linearly and to cross a direction tangential to the circumference of the circle at an average angle (crossing angle of the middle part of the linear bead) of about ±30° or less, and more preferably about ±20° or less.

The operation pedal of the third and fourth aspects of the invention includes the flat attachment seat that fixes the ratchet member, and the bead is formed in the attachment seat. However, the present invention is also applicable to operation pedals that do not have the attachment seat. In the fourth aspect of the invention, the bead is formed in both the attachment seat and the base plate portion. However, the bead may be formed in only one of the attachment seat and the base plate portion. The beads in the attachment seat and the base plate portion may be formed so as to be continuous with each other. However, the beads in the attachment seat and the base plate portion may be separate beads that are separated from each other.

In the fifth aspect of the invention, the ratchet member is attached to the operation pedal at the two positions, namely the front end of the ratchet member and the intermediate position in the ratchet member, by rivets or screws, resistance welding, etc. However, when other aspects of the invention are carried out, various forms are possible such as the ratchet member being fixed to the operation pedal at two positions, namely the front and rear ends of the ratchet member, at three positions, namely the front end, the rear end, and the intermediate position of the ratchet member, or at two positions, namely the rear end and the intermediate position of the ratchet member. The ratchet member may be fixed to the operation pedal continuously along the entire or a part of the length in the longitudinal direction (direction of the arc) by arc welding, an adhesive, etc.

Embodiments

Embodiments of the present invention will be described in detail with reference to the accompanying drawings.

Figure 2:
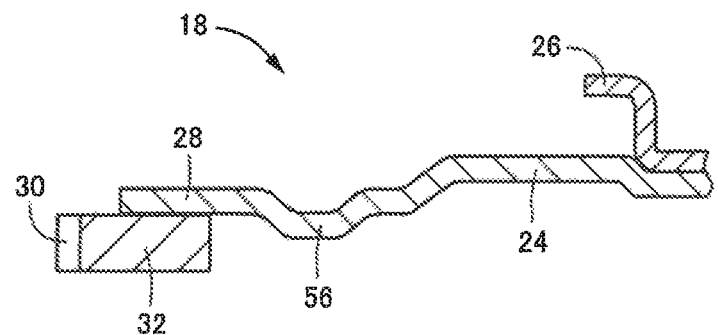
FIG. 2 is a sectional view taken along line II-II and viewed in the direction of arrow II-II in FIG. 1.
Figure 3:
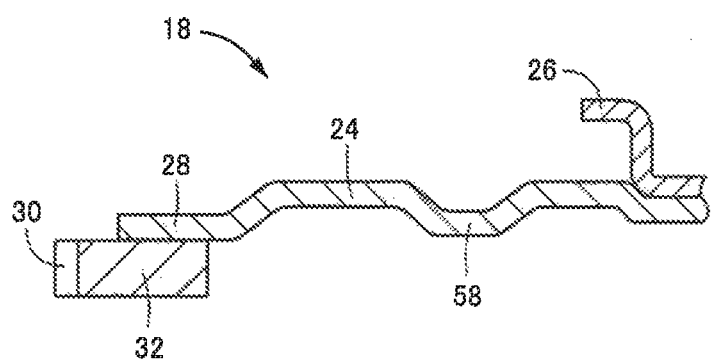
FIG. 3 is a sectional view taken along line III-III and viewed in the direction of arrow III-III in FIG. 1.

FIG. 1 is a schematic partially cutaway side view showing a foot-operated parking brake operation device 10 according to an embodiment of the present invention, as viewed from the side (left side) of a vehicle having the foot-operated parking brake operation device 10 mounted therein. FIG. 2 is a sectional view taken along line II-II and viewed in the direction of arrow II-II in FIG. 1, and FIG. 3 is a sectional view taken along line III-III and viewed in the direction of arrow III-III in FIG. 1. This foot-operated parking brake operation device 10 includes an operation pedal 18 that is disposed on a pedal support 14 fixedly disposed on a vehicle body-side member such as a dash panel at a position in front of the driver's seat, and the operation pedal 18 is disposed so that it can pivot about a support axis S serving as an axis of a support shaft 16. The operation pedal 18 is a metal plate material formed into a predetermined shape by press bending etc. and has a step portion 20 such as a pedal pad at its lower end. When the driver depresses the step portion 20 with his or her foot, the operation pedal 18 is caused to pivot clockwise in FIG. 1, namely in one direction about the support axis S. The operation pedal 18 thus pulls a brake cable 22 to actuate a parking brake disposed in a wheel, not shown. The operation pedal 18 is mainly comprised of a flat base plate portion 24 that is substantially perpendicular to the support axis S. A guide member 26 along which the brake cable 22 is wound is fixedly attached to the right side surface (the opposite surface from the surface shown in FIG. 1) of the base plate portion 24 by welding etc.

The operation pedal 18 has in its upper front part a flat attachment seat 28 bent into a crank with respect to the base plate portion 24 in the thickness direction (toward the viewer of FIG. 1). A ratchet member 32 having multiple teeth 30 along an arc shape about the support axis S is fixedly attached to the attachment seat 28 via a pair of rivets 34, 36. A pawl 42 is disposed on the pedal support 14 so that the pawl 42 can rotate about an axis of a pawl pin 40 which is parallel to the support axis S. The pawl 42 is biased so as to rotate clockwise about the pawl pin 40 by a helical torsion spring 44 having its both ends hooked and held on the pawl 42 and the pedal support 14, so that a pawl portion 46 meshes with the tooth 30 of the ratchet member 32. The helical torsion spring 44 corresponds to the pawl biasing spring.

The multiple teeth 30 are inclined teeth inclined counterclockwise in FIG. 1 about the support axis S, namely in the opposite direction that the operation pedal 18 is depressed. When a braking operation is started, namely when the operation pedal 18 is depressed from its original position shown in FIG. 1, the pawl portion 46 of the pawl 42 is engaged with the teeth 30 from the front end (upper end in FIG. 1) side of the ratchet member 32. At this time, the pawl 42 can swing against the biasing force of the helical torsion spring 44 and ride over the teeth 30, whereby the operation of depressing the operation pedal 18 can be permitted. However, when the operation pedal 18 is caused to pivot back toward its original position, the pawl portion 46 meshes with the tooth 30. This prevents the operation pedal 18 from pivoting back toward its original position and the parking brake is kept in the actuated state. The ratchet member 32 is made of a metal material, and the pawl 42 is made of a composite material of a metal material and a synthetic resin. However, for example, non-meshing tooth surfaces of the teeth 30, namely the tooth surfaces to which the pawl 42 contacts to ride over the teeth 30 when the braking operation is started, the surface of the pawl portion 46 of the pawl 42 which contacts these tooth surfaces, etc. may be coated with a synthetic resin etc. The pair of rivets 34, 36 fix the ratchet member 32 to the attachment seat 28 of the operation pedal 18 at two positions, namely at the front end of the ratchet member 32 and an intermediate position between the front and rear ends of the ratchet member 32.

The pawl pin 40 is inserted through a long hole 48 formed in the pawl 42. When the operation of depressing the operation pedal 18 is stopped and the operation pedal 18 attempts to pivot back according to the tensile force of the brake cable 22, the pawl portion 46 of the pawl 42 meshes with the tooth 30 of the ratchet member 32 and the center of rotation of the pawl 42 is shifted counterclockwise about the support axis S within an allowable range due to the long hole 48, so that the biasing direction of the helical torsion spring 44 is reversed. In this case as well, the pawl 42 and the tooth 30 are kept meshing with each other based on the tensile force of the brake cable 22, whereby the parking brake is held in the actuated state. However, when the operation pedal 18 is depressed again and the meshing pressure is released, the pawl 42 is caused to pivot counterclockwise about the pawl pin 40 due to the biasing force of the helical torsion spring 44, so that the pawl 42 is not allowed to mesh with the tooth 30. The operation pedal 18 is thus allowed to pivot back. The operation pedal 18 is therefore returned to its original position according to the tensile force of the brake cable 22 and the biasing force of a return spring, not shown, and the parking brake is released. The original position of the operation pedal 18 is determined by a stopper 50 attached to the pedal support 14. When the operation pedal 18 is caused to pivot back to its original position, a return engagement portion 52 is engaged with the pawl 42, whereby the pawl 42 is caused to pivot clockwise about the pawl pin 40, the center of rotation of the pawl 42 is restored to its initial position shown in FIG. 1, and the biasing direction of the helical torsion spring 44 is returned to the clockwise direction. The initial position of the pawl 42 is determined by a pawl stopper 54.

When a braking operation is started, namely when the operation pedal 18 is depressed in order to actuate the parking brake, the pawl 42 swings against the biasing force of the helical torsion spring 44 and successively rides over the teeth 30 of the ratchet member 32. However, every time the pawl 42 rides over a single tooth 30, the pawl 42 contacts the subsequent tooth 30 due to the biasing force of the helical torsion spring 44, making ratchet sound consisting of successive hitting sounds. In particular, since the operation pedal 18 is made of a metal plate material, vibrations of the ratchet member 32 are propagated to the attachment seat 28 and the base plate portion 24 of the operation pedal 18 and are amplified, which may result in loud ratchet sound.

In the foot-operated parking brake operation device 10 of the present embodiment, however, the attachment seat 28 of the operation pedal 18 is provided with a bead 56 which is formed by bending the attachment seat 28 and which has a convex section, the bead 56 extending in a direction crossing a vibration waveform of the ratchet sound, which would be generated when the pawl 42 is brought into contact with each of the teeth 30 in absence of provision of the bead 56 in the attachment seat 28. That is, the upper part of the attachment seat 28 in FIG. 1 where the front end of the ratchet member 32 is located includes a projecting part that projects toward the support axis S, and the bead 56 projecting in a convex shape toward the surface of the attachment seat 28 which has the ratchet member 32 fixed thereto as shown in FIG. 2 is formed in the projecting part of the attachment seat 28. In the present embodiment, the bead 56 has a trapezoidal section and is formed by pressing. The vibration waveform can be obtained by modal analysis, for example. It is desirable to form the bead 56 extending in a direction substantially perpendicular to the waveform, for example, in a direction within the range of about ±20° or less with respect to the direction perpendicular to the waveform. In the present embodiment, the bead 56 is formed so as to extend substantially linearly and to cross the direction perpendicular to the vibration waveform at an average angle of about ±20° or less. Such a bead 56 is thus formed so as to extend in the circumferential direction about the support axis S and to cross the direction tangential to the circumference of the circle at an average angle of about ±20° or less, for example. The attachment seat 28 corresponds to the flat portion.

In the present embodiment, on the rear end side of the ratchet member 32 as well, a bead 58 is formed in the flat base plate portion 24 between the attachment seat 28 and the support axis S so as to project in a convex shape toward the surface of the base plate portion 24 which has the ratchet member 32 fixed thereto and to have a trapezoidal section like the bead 56, and so as to extend linearly in a direction crossing the vibration waveform, that is, in the circumferential direction about the support axis S. The bead 58 is a separate bead from the bead 56 and is separated from the bead 56. However, the beads 56, 58 may be formed so as to be connected and continuous with each other like, e.g., a bead 62 of a foot-operated parking brake operation device 60 shown in FIG. 6. In the present embodiment, the base plate portion 24 having the bead 58 also corresponds to the flat portion.

Such foot-operated parking brake operation devices 10, 60 of the embodiments include, as the flat portion, the attachment seat 28 and the base plate portion 24 located between the support axis S of the operation pedal 18 and the ratchet member 32. Accordingly, vibrations of the ratchet member 32 may be propagated to the attachment seat 28 and the base plate portion 24 and ratchet sound may be amplified. In the embodiments, however, the attachment seat 28 and the base plate portion 24 are provided with the beads 56, 58 which are formed by bending the attachment seat 28 and the base plate portion 24 and which have a convex section, the beads 56, 58 extending in the direction substantially perpendicular to the vibration waveform of the ratchet sound, which would be generated when the pawl 42 is brought into contact with each of the teeth 30 in absence of provision of the beads 56, 58 in the attachment seat 28 and the base plate portion 24, namely in the circumferential direction about the support axis S. This increases rigidity against the vibrations and restrains propagation of the vibrations and effectively reduces the ratchet sound.

In the embodiments, the part of the attachment seat 28 where the front end of the ratchet member 32 is located comprises the projecting part that projects toward the support axis S, and the bead 56 is formed in the projecting part of the attachment seat 28. On the rear end side of the ratchet member 32, the bead 58 is formed in the base plate portion 24 between the attachment seat 28 and the support axis S. This increases rigidity of both the attachment seat 28 and the base plate portion 24 and appropriately reduces the ratchet sound.

Figure 6:
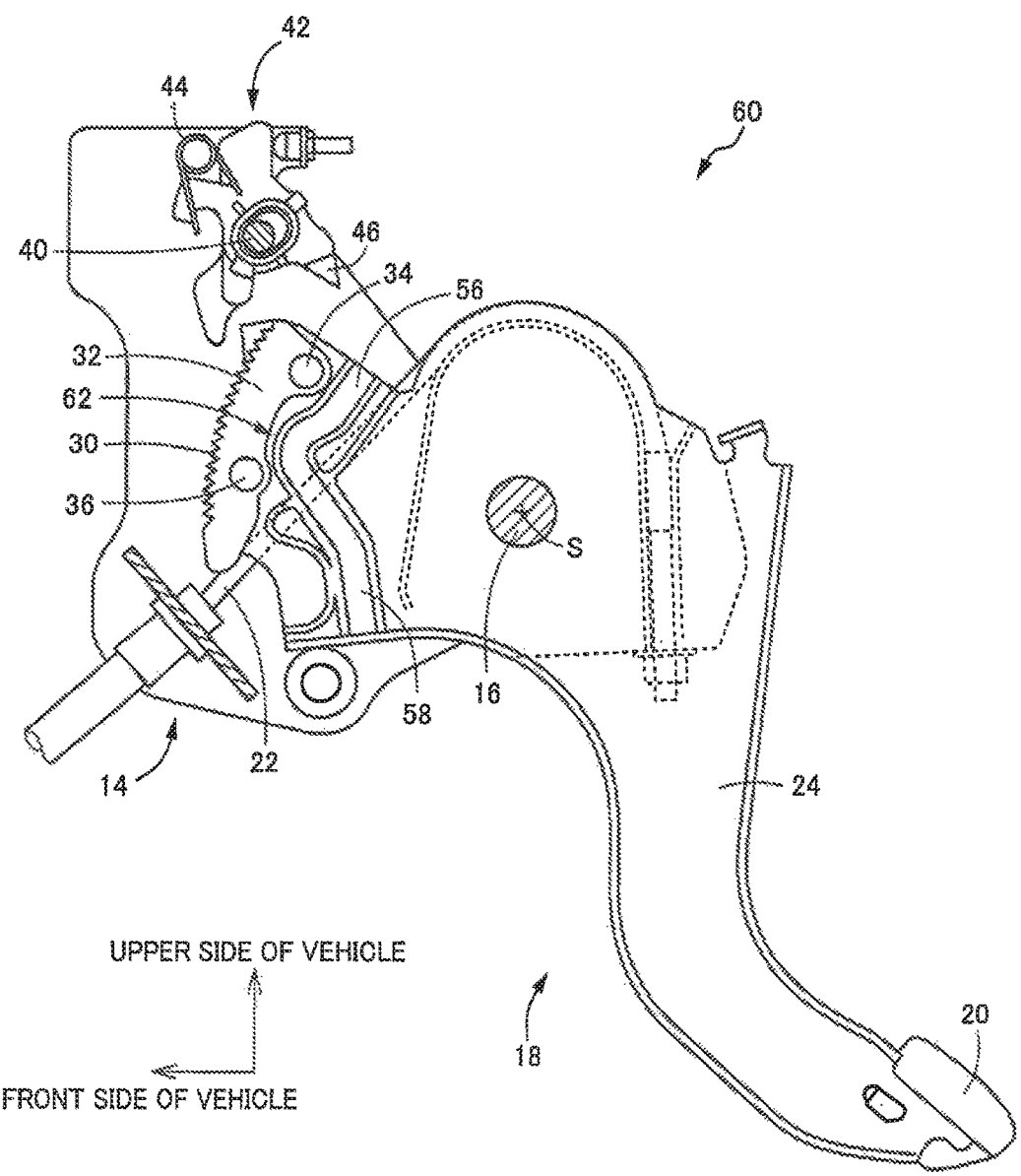
FIG. 6 is a schematic left side view corresponding to FIG. 1, illustrating another embodiment of the present invention.

In the case where the beads 56, 58 are separated from each other as in the embodiment in FIG. 1, higher resistance against bending deformation with the beads 56, 58 forming a ridge can be ensured as compared to the case where the beads 56, 58 are connected and continuous with each other like the bead 62 of the embodiment in FIG. 6.

In the embodiments, the ratchet member 32 is fixed to the operation pedal 18 at the two positions, namely at the front end of the ratchet member 32 and the intermediate position in the ratchet member 32. This allows the front end side of the ratchet member 32 to be restrained without increasing the region of the fixed portion, whereby initial ratchet sound, namely loud hitting sounds at the beginning, can be particularly effectively reduced. Moreover, the range of variation in sound pressure level (loudness of sound) of individual hitting sounds that are generated when the pawl 42 contacts the multiple teeth 30 is reduced, whereby the ratchet sound can be made less harsh to the ear.

Figure 11:
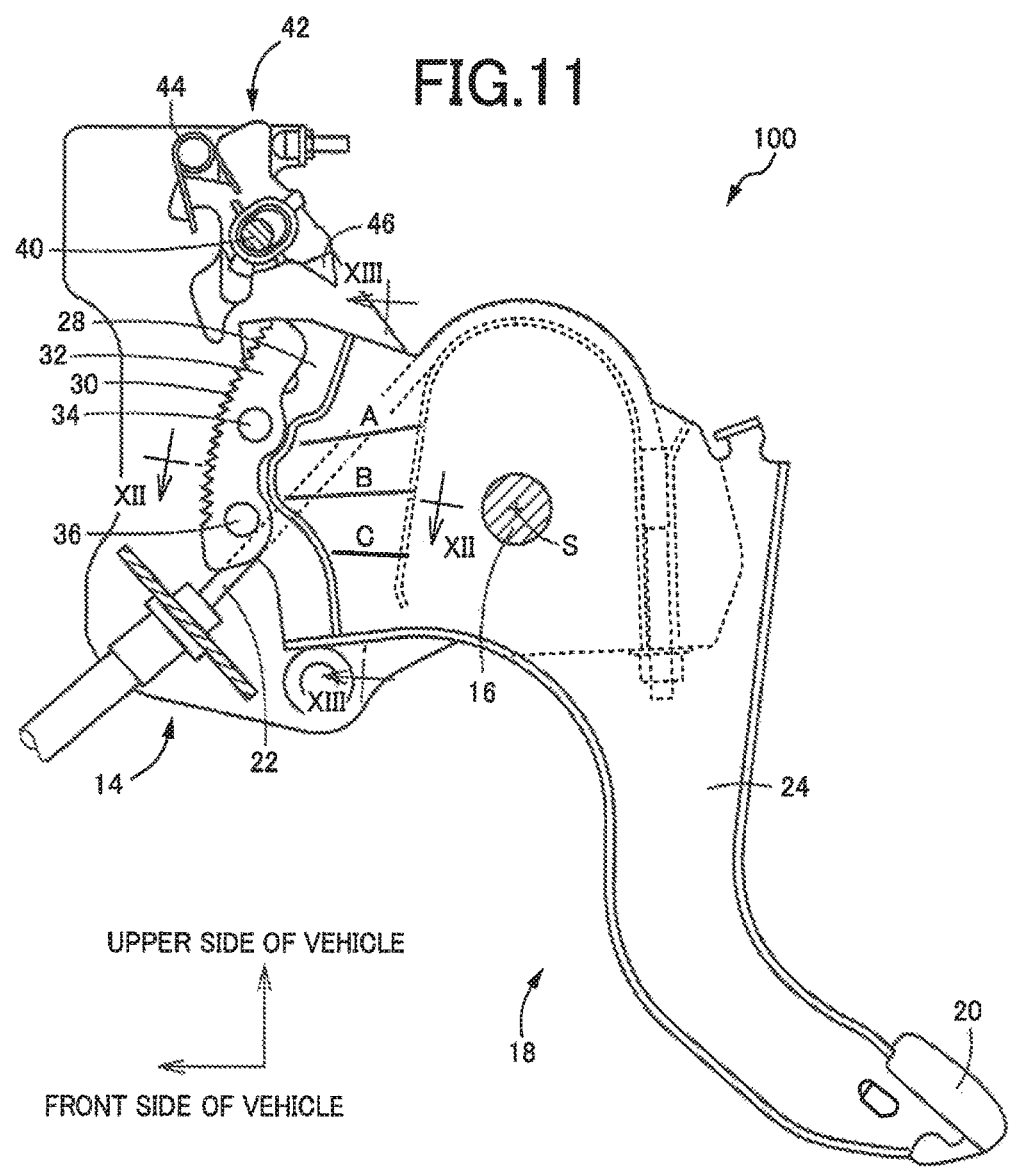
FIG. 11 is a schematic left side view corresponding to FIG. 1, illustrating an example of a conventional foot-operated parking brake operation device.
Figure 12:
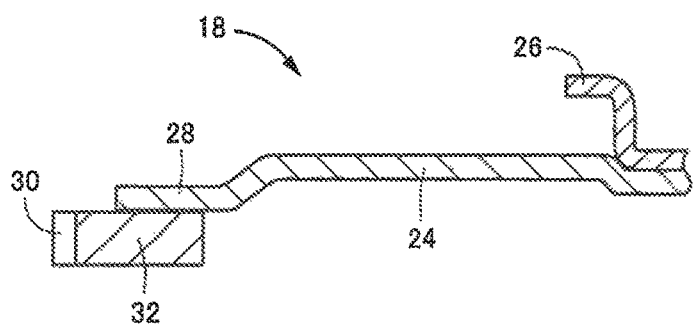
FIG. 12 is a sectional view taken along line XII-XII and viewed in the direction of arrow XII-XII in FIG. 11.
Figure 13:
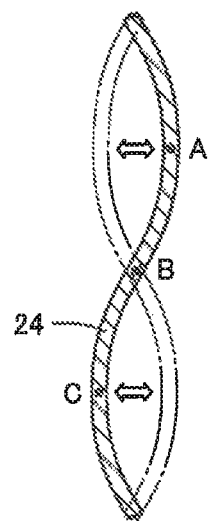
FIG. 13 is a sectional view taken along line XIII-XIII and viewed in the direction of arrow XIII-XIII in FIG. 11, schematically showing a vibration waveform of ratchet sound that is generated when a braking operation is started.

A foot-operated parking brake operation device 100 shown in FIGS. 11 and 12 is a conventional product in which the beads 56, 58 are not formed and the ratchet member 32 is fixed to the attachment seat 28 of the operation pedal 18 at two positions, namely the rear end of the ratchet member 32 and an intermediate position in the ratchet member 32. FIG. 12 is a sectional view taken along line XII-XII and viewed in the direction of arrow XII-XII in FIG. 11. A vibration waveform of ratchet sound that is generated when a braking operation, namely an operation of depressing the operation pedal 18, is started in such a foot-operated parking brake operation device 100 was obtained by modal analysis. The vibration waveform thus obtained is as shown in FIG. 13 in the portion taken along line XIII-XIII and viewed in the direction of arrow XIII-XIII in FIG. 11. FIG. 13 is a view schematically showing the vibration waveform, and portions A, B, and C correspond to lines A, B, and C in FIG. 11, respectively. FIG. 13 is a sectional view taken along a direction substantially perpendicular to the vibration waveform shown by the lines A, B, and C. The line A (portion A) and the line C (portion C) correspond to antinodes (crest and trough) of the vibration waveform, and the line B (portion B) corresponds to a node thereof. In the foot-operated parking brake operation devices 10, 60 as well, ratchet sound is generated with a similar vibration waveform if the beads 56, 58, 62 are not formed.

Figure 4:
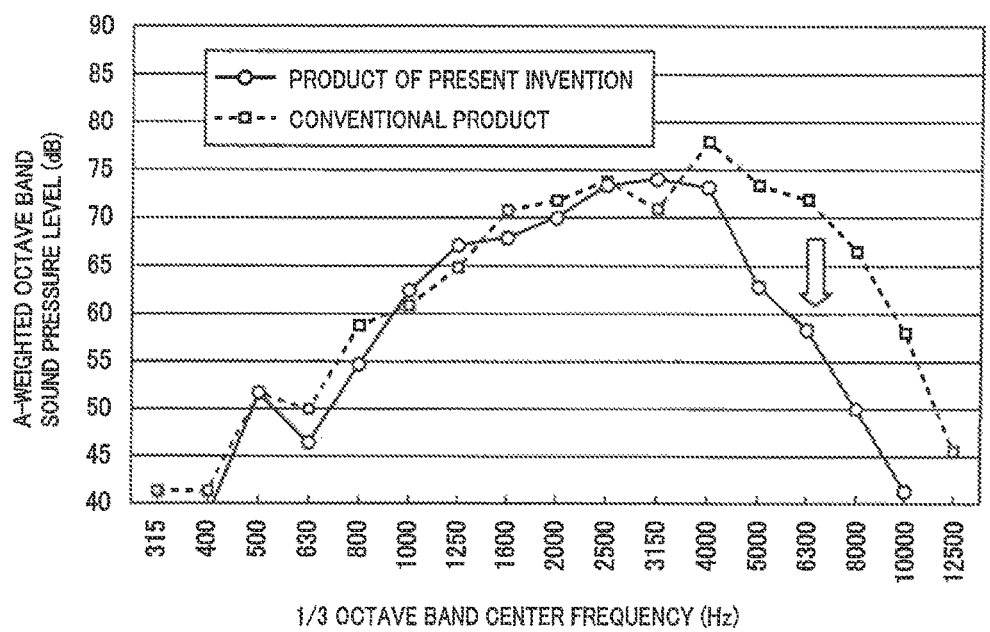
FIG. 4 is a diagram showing comparison of frequency characteristics of ratchet sound (successive hitting sounds) that is generated when a braking operation is started between the product of the present invention and a conventional product.
Figure 5:
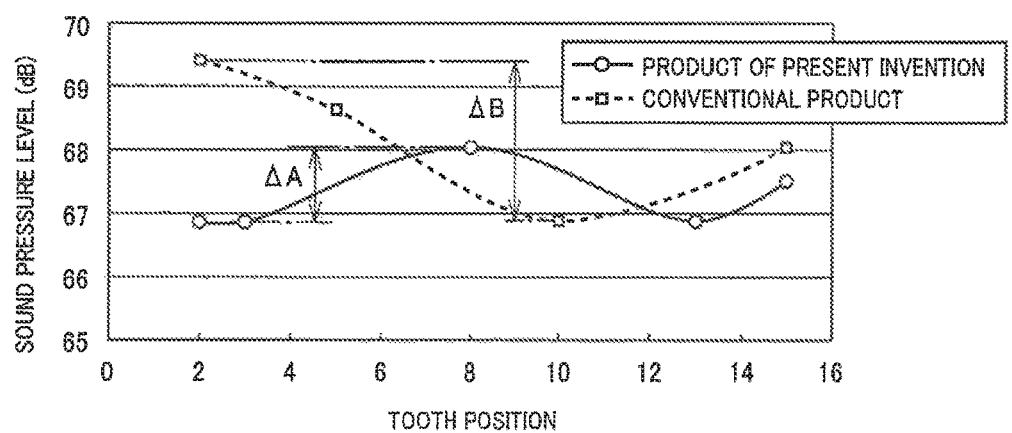
FIG. 5 is a diagram showing comparison, between the product of the present invention and the conventional product, of the relationship between each of individual hitting sounds against multiple teeth which are generated when a braking operation is started and the position of each tooth.

Regarding the foot-operated parking brake operation device 10 as a product of the present invention and the foot-operated parking brake operation device 100 as a conventional product, ratchet sound (successive hitting sounds) generated when a braking operation, namely an operation of depressing the operation pedal 18, was started was measured. As shown in FIG. 4, the product of the present invention has reduced sound pressure levels particularly for high-pitched sounds in a high frequency region (4,000 Hz or higher). As shown in FIG. 5, comparison of the sound pressure levels of individual hitting sounds of the multiple teeth 30 of the ratchet member 32 shows that the product of the present invention has reduced sound pressure levels on the front end side of the ratchet member 32 (the side with smaller numerals of the tooth positions), and the range of variation $\Delta A$ in sound pressure level is substantially about half the range of variation $\Delta B$ of the conventional product.

Other embodiments of the present invention will be described below. In the following embodiments, substantially the same portions as those of the above embodiments are denoted with the same reference characters and detailed description thereof will be omitted.

Figure 7:
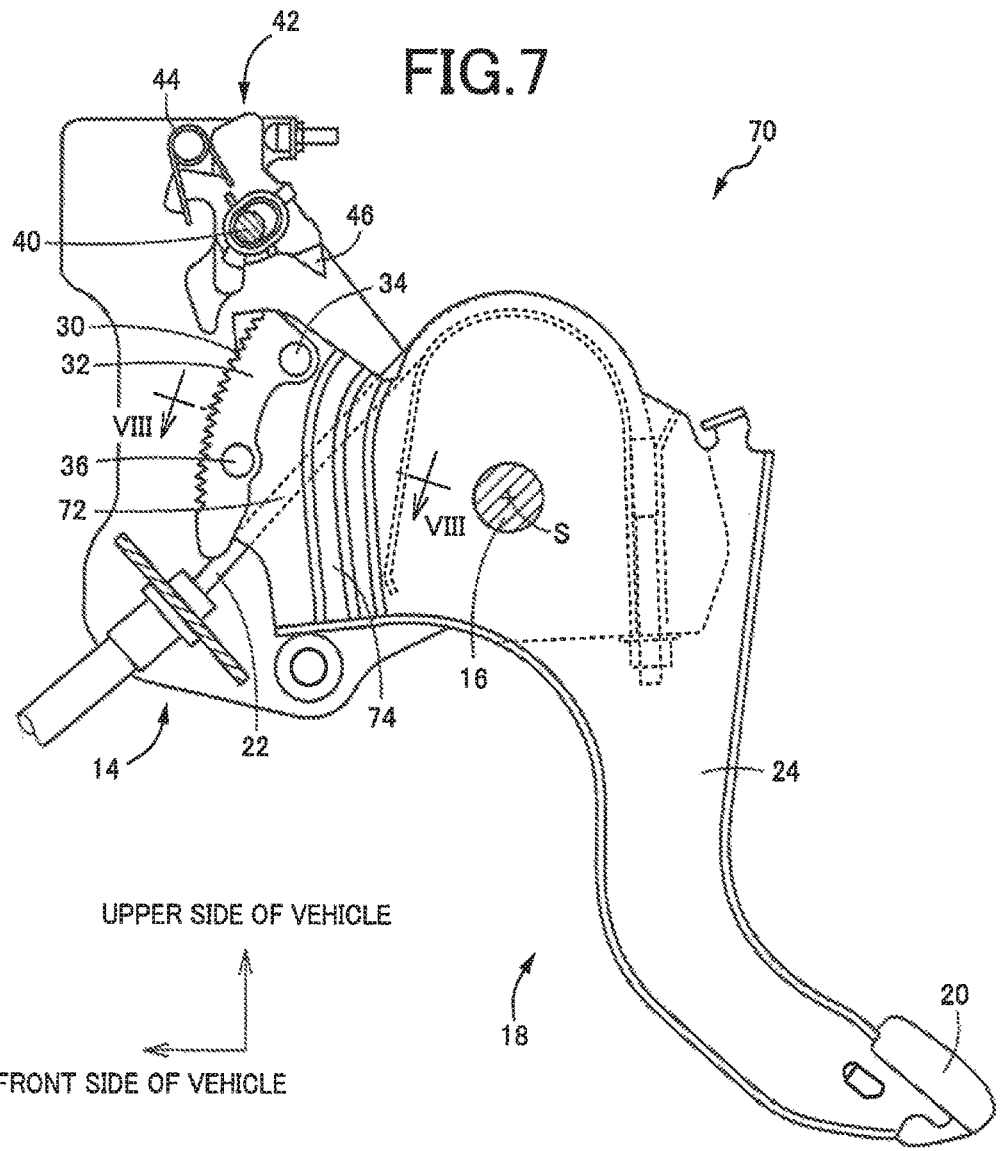
FIG. 7 is a schematic left side view corresponding to FIG. 1, illustrating still another embodiment of the present invention.
Figure 8:
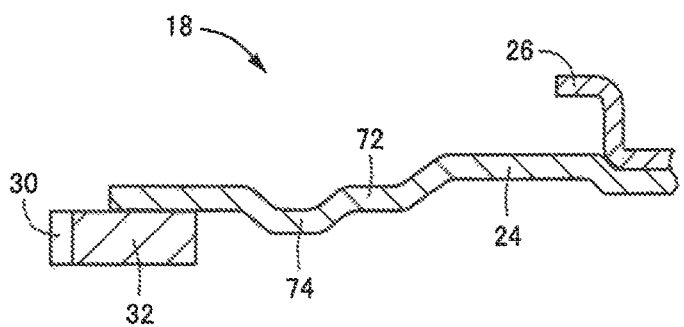
FIG. 8 is a sectional view taken along line VIII-VIII and viewed in the direction of arrow VIII-VIII in FIG. 7.

In a foot-operated parking brake operation device 70 shown in FIGS. 7 and 8, an attachment seat 72 to which the ratchet member 32 is attached projects toward the support axis S along the entire length in the longitudinal direction of the ratchet member 32. The attachment seat 72 is provided with a single bead 74 which is formed by bending the attachment seat 72 and which has a convex section, the bead 74 extending in a direction substantially perpendicular to a vibration waveform of ratchet sound, which would be generated when the pawl 42 is brought into contact with each of the teeth 30 in absence of provision of the bead 74 in the attachment seat 72, namely in the circumferential direction about the support axis S. The bead 74 is formed along the entire length in the circumferential direction of the attachment seat 72. FIG. 8 is a sectional view taken along line VIII-VIII and viewed in the direction of arrow VIII-VIII in FIG. 7. In the present embodiment, the attachment seat 72 corresponds to the flat portion.

Figure 9:
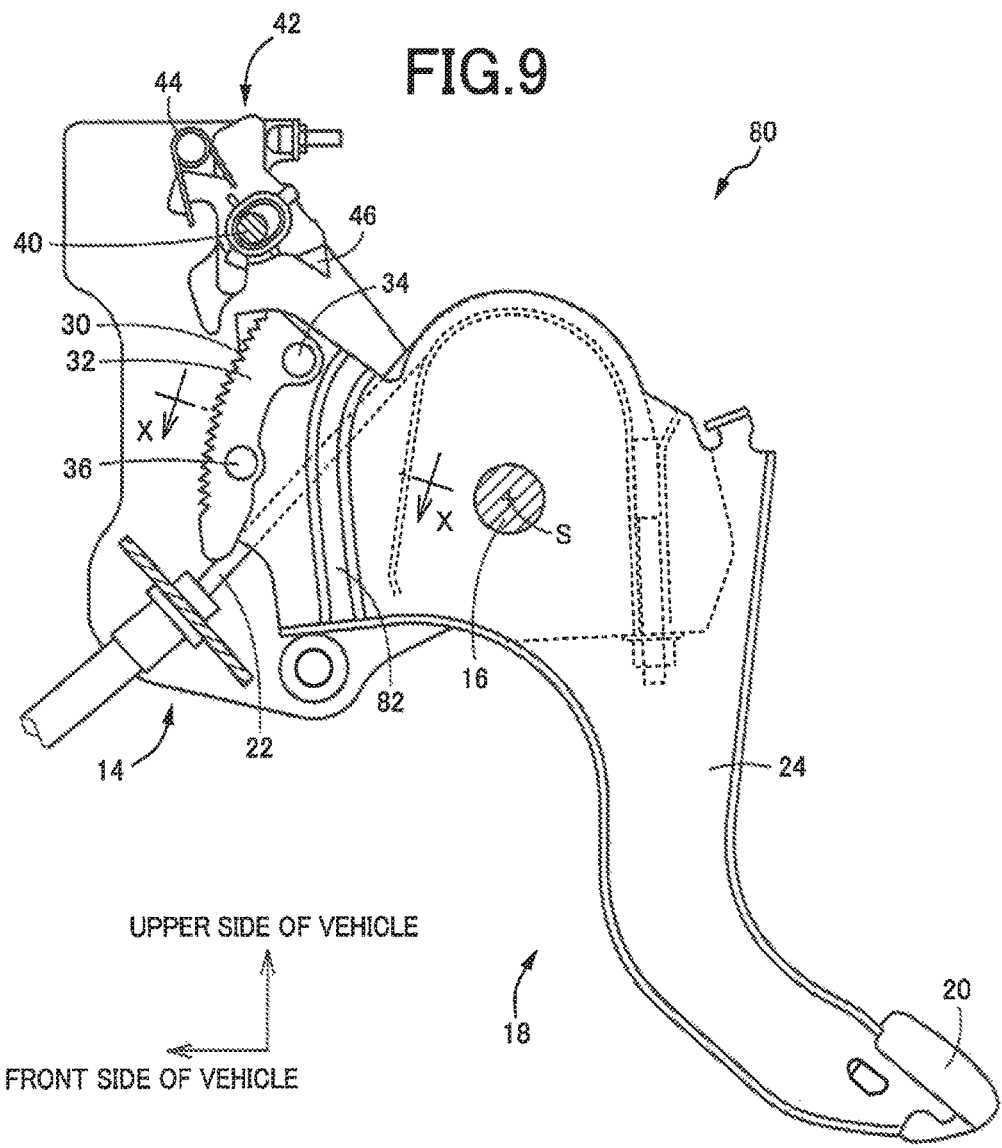
FIG. 9 is a schematic left side view corresponding to FIG. 1, illustrating still another embodiment of the present invention.
Figure 10:
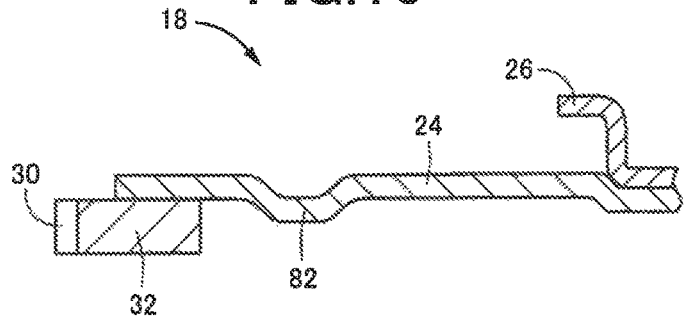
FIG. 10 is a sectional view taken along line X-X and viewed in the direction of arrow X-X in FIG. 9.

In a foot-operated parking brake operation device 80 shown in FIGS. 9 and 10, the ratchet member 32 is attached to the base plate portion 24 of the operation pedal 18. The base plate portion 24 is provided with a single bead 82 which is formed by bending the base plate portion 24 and which has a convex section, the bead 82 extending in a direction substantially perpendicular to a vibration waveform of ratchet sound, which would be generated when the pawl 42 is brought into contact with each of the teeth 30 in absence of provision of the bead 82 in the base plate portion 24, namely in the circumferential direction about the support axis S. The bead 82 is formed in an intermediate part of the base plate portion 24 between a part of the base plate portion 24 which has the ratchet member 32 fixed thereto and the support axis S. FIG. 10 is a sectional view taken along line X-X and viewed in the direction of arrow X-X in FIG. 9. In the present embodiment, the base plate portion 24 corresponds to the flat portion.

Although the embodiments of the present invention are described above in detail based on the drawings, the embodiments are shown by way of example only, and the present invention can be embodied in various modified or improved forms based on the knowledge of those skilled in the art.

REFERENCE SIGNS LIST

10, 60, 70, 80: Foot-operated parking brake operation device 14: Pedal support 16: Support shaft 18: Operation pedal 22: Brake cable 24: Base plate portion (Flat portion) 28, 72: Attachment seat (Flat portion) 30: Tooth 32: Ratchet member 42: Pawl 44: Torsion coil spring (Pawl biasing spring) 56, 58, 62, 74, 82: Bead S: Support axis

The invention claimed is:

1. A foot-operated parking brake operation device comprising:
- an operation pedal made of a metal plate material, the operation pedal configured to actuate a parking brake when depressed and pivoted in one direction about a support axis;
- a ratchet member fixedly attached to the operation pedal, the ratchet member including multiple teeth arranged along an arc about the support axis;
- a pawl disposed on a pedal support and pivotable about an axis parallel to the support axis, the pawl being configured, when meshing with one of the multiple teeth, to prevent the operation pedal from being pivoted back toward an original position thereof in a direction opposite to the one direction whereby the parking brake is kept in an actuated state thereof; and
- a pawl biasing spring biasing the pawl in such a rotational direction that causes the pawl to mesh with one of the multiple teeth of the ratchet member; wherein:
  - upon start of a brake operation of depressing the operation pedal, the pawl is relatively moved from a front end of the ratchet member and over the multiple teeth, such that each time the pawl rides over each of the teeth, the pawl is brought into contact with a subsequent tooth of the multiple teeth due to a biasing force of the pawl biasing spring applied to the pawl,
  - the operation pedal includes a plate-shaped flat portion located between the support axis and the ratchet member, and
  - the flat portion is provided with a bead which is formed by bending the flat portion and which has a convex section, the bead extending in a circumferential direction about the support axis.

2. The foot-operated parking brake operation device according to claim 1, wherein the operation pedal includes a flat attachment seat bent into a crank in a thickness direction, the ratchet member is fixedly attached to the attachment seat, and the bead is formed in the attachment seat corresponding to the flat portion.

3. The foot-operated parking brake operation device according to claim 2, wherein
- a part of the attachment seat where a front end of the ratchet member is located includes a projecting part that projects toward the support axis, the bead being formed in the projecting part, and
- on a rear end side of the ratchet member, the bead is formed in a base plate portion provided as the flat portion between the attachment seat and the support axis.

4. The foot-operated parking brake operation device according to claim 3, wherein the ratchet member is attached to the operation pedal at two locations that are the front end of the ratchet member and an intermediate location between the front and rear ends of the ratchet member.

5. The foot-operated parking brake operation device according to claim 2, wherein the ratchet member is attached to the operation pedal at two locations that are the front end of the ratchet member and an intermediate location between the front and rear ends of the ratchet member.

6. The foot-operated parking brake operation device according to claim 1, wherein the ratchet member is attached to the operation pedal at two locations that are the front end of the ratchet member and an intermediate location between the front and rear ends of the ratchet member.

* * * * *